US008718600B2

(12) United States Patent
Ehlen et al.

(10) Patent No.: US 8,718,600 B2
(45) Date of Patent: May 6, 2014

(54) OPERATION OF A TERMINAL WHICH CAN BE USED WITH AN ACCOUNT IN A MOBILE NETWORK WHICH PROVIDES COMMUNICATION SERVICES

(75) Inventors: Ingo Ehlen, Duesseldorf (DE); Peter Norff, Dormagen (DE); Mike Hartl, Ratingen (DE)

(73) Assignee: Vodafone Holding GmbH (DE)

( * ) Notice: Subject to any disclaimer, the term of this patent is extended or adjusted under 35 U.S.C. 154(b) by 164 days.

(21) Appl. No.: 12/964,469

(22) Filed: Dec. 9, 2010

(65) Prior Publication Data

US 2011/0217948 A1 Sep. 8, 2011

(30) Foreign Application Priority Data

Dec. 9, 2009 (DE) .......................... 10 2009 057 384

(51) Int. Cl.
*H04M 11/00* (2006.01)

(52) U.S. Cl.
USPC ............................ 455/406; 455/407; 455/408

(58) Field of Classification Search
CPC ................................. H01W 4/24; H01W 4/26
USPC ......................................... 455/406, 407, 408
See application file for complete search history.

(56) References Cited

U.S. PATENT DOCUMENTS

| 6,430,406 | B1 | 8/2002 | Frisk | |
|---|---|---|---|---|
| 7,215,942 | B1 * | 5/2007 | McQuaide et al. | 455/408 |
| 7,965,997 | B2 * | 6/2011 | Sposato et al. | 455/406 |
| 8,219,062 | B2 * | 7/2012 | Bandera et al. | 455/405 |
| 2003/0224810 | A1 | 12/2003 | Enzmann et al. | |
| 2012/0064858 | A1 * | 3/2012 | Cai et al. | 455/406 |

FOREIGN PATENT DOCUMENTS

EP         1465399 A1    10/2004

OTHER PUBLICATIONS

Nokia: Nokia Prepaid Tracker, Datasheet, 2005, 2 pages, www.nokia.com.

* cited by examiner

*Primary Examiner* — Christopher M Brandt
*Assistant Examiner* — Muthuswamy Manoharan
(74) *Attorney, Agent, or Firm* — St. Onge Steward Johnston & Reens LLC

(57) ABSTRACT

A method for operating a terminal which can be used with a credit account with an account statement and/or with a subscriber's account with subsequent rendering of accounts with an account statement and which can be used in a mobile network which provides communication services. The terminal comprises at least one display device for the reproduction of information and at least one input device for the gathering of information. The account statement of the credit account and/or of the subscriber's account will be reproduced by the display device of the terminal at least after having made use of a chargeable communication service. After using a chargeable communication service by the terminal, a device of the mobile network sends a trigger message which contains information with respect to the costs of the used chargeable communication service to a server of the mobile network. The server realizes a push service, and then triggers a push message to the terminal using the information of the trigger message. The push message contains information with respect to the account statement of the credit account and/or of the subscriber's account, by means of a push service of the mobile network.

9 Claims, 2 Drawing Sheets

OPERATION OF A TERMINAL WHICH CAN BE USED WITH AN ACCOUNT IN A MOBILE NETWORK WHICH PROVIDES COMMUNICATION SERVICES

CROSS-REFERENCE TO RELATED APPLICATIONS

The present application claims priority of pending German patent application No. 10 2009 057 384.4 filed on Dec. 9, 2009, the content of which is incorporated herein by reference.

FIELD OF THE INVENTION

The present invention relates to a method for operating a terminal which can be used with at least one credit account with at least one account statement and/or with at least one subscriber's account with subsequent rendering of accounts with at least one account statement and which can be used in a mobile network which provides communication services, in particular in a mobile network according to a GSM, GPRS, UMTS and/or LTE radio network standard, which terminal comprises at least one display device for the optical, acoustic and/or sensual reproduction of information and at least one input device for the optical, acoustic and/or sensual gathering of information, wherein the at least one account statement of the at least one credit account and/or of the at least one subscriber's account with subsequent rendering of accounts will be reproduced by the display device of the terminal (A-party) at least after having completed at least one chargeable communication service of the mobile network, which has been used by the terminal.

Another subject of the present invention is furthermore a terminal for the operation in a mobile network which provides communication services, in particular in a mobile network according to a GSM, GPRS, UMTS and/or LTE radio network standard, comprising at least one credit account with at least one statement of account and/or at least one subscriber's account with subsequent rendering of accounts with at least one statement of account, which terminal comprises at least one display device for the optical, acoustic and/or sensual reproduction of information and at least one input device for the optical, acoustic and/or sensual gathering of information, and which terminal is designed and/or adapted to at least partially carry out a method according to the invention.

Another subject of the present invention is furthermore a device, preferably a computer unit in a mobile network which provides communication services, in particular a mobile network according to a GSM, GPRS, UMTS and/or LTE radio network standard, which device is at least partially involved in administrating and/or keeping at least one credit account and/or at least one subscriber's account with subsequent rendering of accounts for billing chargeable communication services which can be utilized by a terminal which can be used in the mobile network, which device is designed and/or adapted to at least partially carry out a method according to the invention.

BACKGROUND OF THE INVENTION

Numerous embodiments and designs of corresponding methods, devices and terminals for the operation in a mobile network which provides communication services, comprising at least one credit account with at least one statement of account and/or at least one subscriber's account with subsequent rendering of accounts with at least one statement of account are known in the state of the art.

In the state of the art corresponding credit accounts are in particular known as so called prepaid cards for mobile phones which can be operated in mobile networks. Corresponding prepaid card systems are standard in the mobile radiotelephone industry, wherein usually time and/or service dependent connections are billed as utilized chargeable communication services of the mobile network to a credit account which is usually administrated and/or kept by a device of the mobile network.

Corresponding subscribers' accounts with subsequent rendering of accounts are in particular known in the state of the art as so called postpaid cards for mobile phones which can be operated in mobile networks. Corresponding postpaid card systems are standard in the mobile radiotelephone industry, wherein usually time and/or service dependent connections are subsequently debited as utilized chargeable communication services of the mobile network to a bank account of the subscriber within the scope of an invoice. Herein, the customer has usually concluded a temporary but renewable service contract with the mobile network provider or a commission agent.

The user's handling of such prepaid and/or postpaid mobile phones has been not very comfortable hitherto, in particular since users of corresponding prepaid mobile phones have to realize complicate and lengthy inputs which are in particular difficult for untrained users for querying the statement of account of a credit account or for recharging the credit on a credit account. Herein, corresponding inputs have hitherto in particular required a call to a so called hotline or an access enabled via the internet to a device of the mobile network, which administrates and/or keeps corresponding subscribers' accounts, wherein users have to know the telephone number of the hotline and/or the internet address of the device of the mobile network, which administrates and/or keeps corresponding subscribers' accounts, and usually have to know and input access requirements, in particular comprising access data, such as the call number allocated to the subscriber's account by the mobile network, in particular the so called MSISDN, user's name, pass word and/or like user authentication information. Herein, such inputs are not always possible, for instance if no internet access is existent or possible, and furthermore they require time and costs. The same is accordingly true for users of so called postpaid mobile phones. Herein, a so called voice portal is usually used by the mobile network.

Based upon this state of the art, it is the object of the present invention to improve the operation of a terminal of the above mentioned type which can be used with a credit account and/or a subscriber's account with subsequent rendering of accounts in a mobile network which provides communication services, in particular with respect to the user's manageability of the credit account or the subscriber's account with subsequent rendering of accounts.

SUMMARY OF THE INVENTION

For the technical solution the present invention proposes a method for operating a terminal which can be used with at least one credit account with at least one account statement and/or with at least one subscriber's account with subsequent rendering of accounts with at least one account statement and which can be used in a mobile network which provides communication services, in particular in a mobile network according to a GSM, GPRS, UMTS and/or LTE radio network standard, which terminal comprises at least one display device for the optical, acoustic and/or sensual reproduction of information and at least one input device for the optical, acoustic and/or sensual gathering of information, wherein the at least one account statement of the at least one credit account and/or of the at least one subscriber's account with subsequent rendering of accounts will be reproduced by the display device of the terminal at least after having completed at least one chargeable communication service of the mobile network, which has been used by the terminal, which method is characterized in that after having used a chargeable communication service of the mobile network by means of the terminal, a device of the mobile network sends a trigger message which contains information with respect to the costs of the used chargeable communication service of the mobile network to a server of the mobile network, which realizes a so called push service, and the server then triggers a push message to the terminal using the information of the trigger message, which push message contains information with respect to the at least one account statement of the at least one credit account and/or of the at least one subscriber's account with subsequent rendering of accounts, by means of a push service of the mobile network. In the present case, the triggering of a push message is in particular the triggering of a precisely timed sending of a push message to the terminal.

In a realization variant of the method according to the invention, the push message will be sent from the server of the mobile network to the terminal, wherein the contents of the push message will be reproduced as received message by the display device of the terminal immediately upon reception. Herein, a decoding of the contents of the push message by the terminal is advantageously unnecessary.

An advantageous embodiment of the invention is characterized in that after a chargeable communication service, in particular a voice call used by the terminal as communication service of the mobile network and/or a credit transfer has been completed, the device of the mobile network sends a trigger message which contains information with respect to the costs and the length of the realized voice call to the server of the mobile network, the server matches respectively brings the information of the received trigger message into line with a device of a billing system of the mobile network and the server then triggers the push message to the terminal using the information of the trigger message.

Another advantageous embodiment of the invention is characterized in that the device of the mobile network is a device of a billing system of the mobile network, which, after a chargeable data connection, SMS or MMS used by the terminal as communication service of the mobile network has been completed, sends a trigger message which contains information with respect to the costs and/or the data volume of the realized data connection, SMS and/or MMS to the server of the mobile network and the server then triggers the push message to the terminal using the information of the trigger message.

Another advantageous embodiment of the invention provides that the at least one device which administrates and/or keeps the at least one credit account and/or the at least one subscriber's account with subsequent rendering of accounts is a device of the mobile network, preferably a device of a billing system of the mobile network or a device of a so called intelligent network (IN: Intelligent Network). Herein, an intelligent network is a service oriented central system which is based upon the existent mobile network and extends this one by intelligent network components and additional features of performance or enables these ones.

In another advantageous embodiment of the invention, a charging of the at least one credit account or a transfer of credit from a credit account or from a subscriber's account with subsequent rendering of accounts to another credit account or another subscriber's account with subsequent rendering of accounts or from a credit account to a subscriber's account with subsequent rendering of accounts is enabled via the mobile network by means of the terminal or via the internet by means of a computer unit, wherein the server is triggered to trigger the push message to the terminal. Herein and according to the invention, a so called top-up event will be advantageously realized during recharging. A recharging of the at least one credit account or a transfer of credit from a credit account or from a subscriber's account with subsequent rendering of accounts to another credit account or another subscriber's account with subsequent rendering of accounts or from a credit account to a subscriber's account with subsequent rendering of accounts is preferably enabled in a dialogue using a graphic menu guidance by means of the terminal and/or by means of the computer unit. According to the invention, another improvement of the user's management of a credit account and/or a subscriber's account with subsequent rendering of accounts is thus obtained, in particular since users get the possibility to administrate their accounts in a dialogue with the device which administrates and/or keeps the respective account, which dialogue is preferably realized via the mobile network, i.e. in particular querying the statement of account, recharging the credit account or realizing a credit transfer. In particular if the statement of account of the credit account is changed hereby, a device of the mobile network advantageously sends a trigger message which contains information with respect to the change of the statement of account of the credit account, after the use of a chargeable communication service of the mobile network by the terminal, to a server of the mobile network, which realizes a so called push service. The server then triggers the sending of a push message which contains information with respect to the at least one statement of account of the at least one credit account to the terminal by means of a push service of the mobile network, using the information of the trigger message.

Advantageously, the push message triggers an automatic reproduction of the at least one statement of account of the at least one credit account and/or the at least one subscriber's account with subsequent rendering of accounts by means of the display device of the terminal.

In another advantageous realization variant, the server of the mobile network sends a message, preferably an actualization SMS to the terminal, which triggers the terminal to send a query with respect to the actual statement of account of the credit account and/or the at least one subscriber's account with subsequent rendering of accounts to the server of the mobile network, whereupon the server triggers a push message which contains information with respect to the at least one statement of account of the at least one credit account and/or the at least one subscriber's account with subsequent rendering of accounts by means of a push service of the mobile network, using the information of the trigger message sent to the server. Furthermore, it is advantageously provided that individually selectable criteria can be predetermined by a user by means of the terminal, which criteria determine on which terms a query with respect to the actual statement of account of the credit account and/or the subscriber's account with subsequent rendering of accounts shall be addressed to the server of the mobile network. Hereby, the possibility is advantageously given to determine by means of the terminal whether the terminal shall address a query with respect to the actual statement of account of the credit account to the server upon each triggering or for instance only after the respectively first triggering on one day. This given option of setting offers the advantage that the user for instance obtains a better general view of the fees which have to be paid for the use of communication services of the mobile network on one day, since otherwise the user is usually only confronted with changes of the statement of account of the credit account, which concern petty amounts.

In another advantageous embodiment of the invention, the at least one statement of account of the at least one credit account and/or of the at least one subscriber's account with subsequent rendering of accounts will be permanently or temporally reproduced by means of the display device of the terminal. Individually pre-determinable criteria can advantageously also be fixed by the terminal with respect to the temporary reproduction, which criteria determine when a statement of account will be reproduced. Herein, a preferred criterion is that the statement of account will in particular be displayed if the statement of account has changed by a previously determined amount, wherein the amount can be individually defined.

Another subject of the present invention is furthermore a terminal for the operation in a mobile network which provides communication services, in particular in a mobile network according to a GSM, GPRS, UMTS and/or LTE radio network standard, comprising at least one credit account with at least one statement of account and/or at least one subscriber's account with subsequent rendering of accounts with at least one statement of account, which terminal comprises at least one display device for the optical, acoustic and/or sensual reproduction of information and at least one input device for the optical, acoustic and/or sensual gathering of information, which terminal is designed and/or adapted to at least partially carry out a method according to the invention.

Another subject of the present invention is furthermore a device, preferably a computer unit in a mobile network which provides communication services, in particular a mobile network according to a GSM, GPRS, UMTS and/or LTE radio network standard, which device is at least partially involved in administrating and/or keeping at least one credit account and/or at least one subscriber's account with subsequent rendering of accounts for billing chargeable communication services which can be utilized by a terminal which can be used in the mobile network, which device is designed and/or adapted to at least partially carry out a method according to the invention.

BRIEF DESCRIPTION OF THE DRAWINGS

Other details, characteristics and advantages will be explained in further detail in the following by means of the exemplary embodiments of the invention represented in the figures of the drawing. Herein.

DETAILED DESCRIPTION OF THE INVENTION

Figure 1:
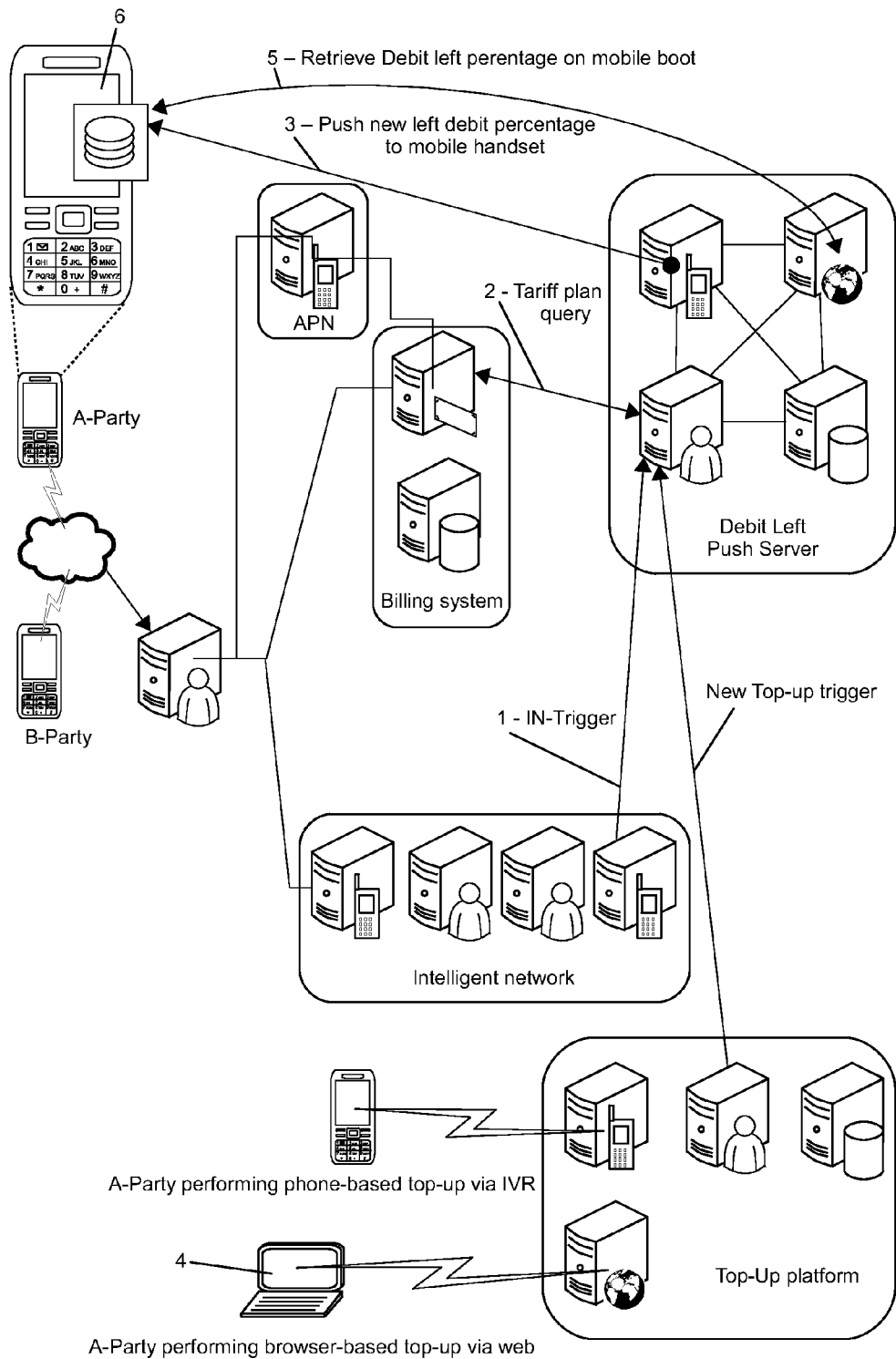
FIG. 1 is a schematic representation which shows the systems and components according to the invention for an operation according to the invention of a terminal which can be used with a credit account in a mobile network which provides communication services and FIG. 2 is a schematic representation of an exemplary embodiment of a reproduction of the statement of account of a credit account by means of a display device of a terminal during an operation according to the invention of a terminal which can be used with a credit account in a mobile network which provides communication services.

FIG. 1 is a block diagram which shows the systems and components which are involved in an operation according to the invention of a terminal which can be used with a credit account in a mobile network which provides communication services. In the following the functioning of said systems and components will be explained in further detail by means of different communication services of the mobile network which can be used by a user A-party, i.e. in the present case a voice call as communication service of the mobile network, and by means of a charging of a credit account (topup event):

a) Voice Call

In the present case, the user A-party who uses a credit account (prepaid) for the use or payment of communication services of the mobile network gives a call to a communication partner B-party using his mobile terminal (mobile phone) which can be operated in the mobile network. Herein, the voice call has been initiated by the user A-party. Therefore, in the present case this one has to bear the costs of the used communication service, namely the voice call. After having completed the voice call, the intelligent network (IN), a service oriented central system which is based upon the existent mobile network and extends this one by intelligent network components and additional features of performance or enables these ones, will send a trigger message IN trigger to a so called Debit Left Push Server DLPS of the mobile network in the process step referenced by the numeral 1. Herein, the trigger message IN trigger comprises information with respect to the costs and the length of the utilized voice call. In the process step referenced by the numeral 2, the Debit Left Push Server DLPS brings this information into line with a computer unit of the billing system with respect to root data and like data, in particular comprising tariff information with respect to used chargeable communication services of the mobile network, of the user A-party, whereby it is advantageously assured to a large extent that the account data will be correctly transmitted to the terminal in the following and statements of account which have been transmitted by means of the terminal will be quasi synchronized with the actual statements of account. Thereafter, the Debit Left Push Server DLPS which realizes a push service will trigger a push message (push Info) to the terminal of the user A-party in the process step referenced by the numeral 3. Herein the push message (push Info) comprises information with respect to the actual statement of account of the credit account (prepaid) of the user A-party. The information with respect to the actual statement of account of the credit account (prepaid) of the user A-party will then be automatically reproduced by means of the display device (display) of the terminal of the user A-party.

b) Charging of a Credit Account (Topup Event)

In FIG. 1 two possibilities of charging the credit account (prepaid) of the user A-party are furthermore represented. On the one hand, the credit account (prepaid) of the user A-party can be charged via the mobile network by means of the terminal of the user A-party, for example using a voice dialogue system IVR of the mobile network. On the other hand, the credit account (prepaid) of the user A-party can be charged via the internet by means of a computer unit 4 of the user A-party. Herein, the user inputs the amount, by which the credit account shall be charged, for instance by means of input of a code of a previously purchased credit charging card. Herein, the Debit Left Push Server DLPS is triggered with a so called New Topup Trigger. Thereafter, the Debit Left Push Server DLPS which realizes a push service will trigger a push message (push Info) to the terminal of the user A-party in the process step referenced by the numeral 5. Herein the push message (push Info) comprises information with respect to the actually charged statement of account of the credit account (prepaid) of the user A-party. The information with respect to the actual statement of account of the credit account (prepaid) of the user A-party will then be automatically reproduced by means of the display device (display) of the terminal of the user A-party.

Figure 2:
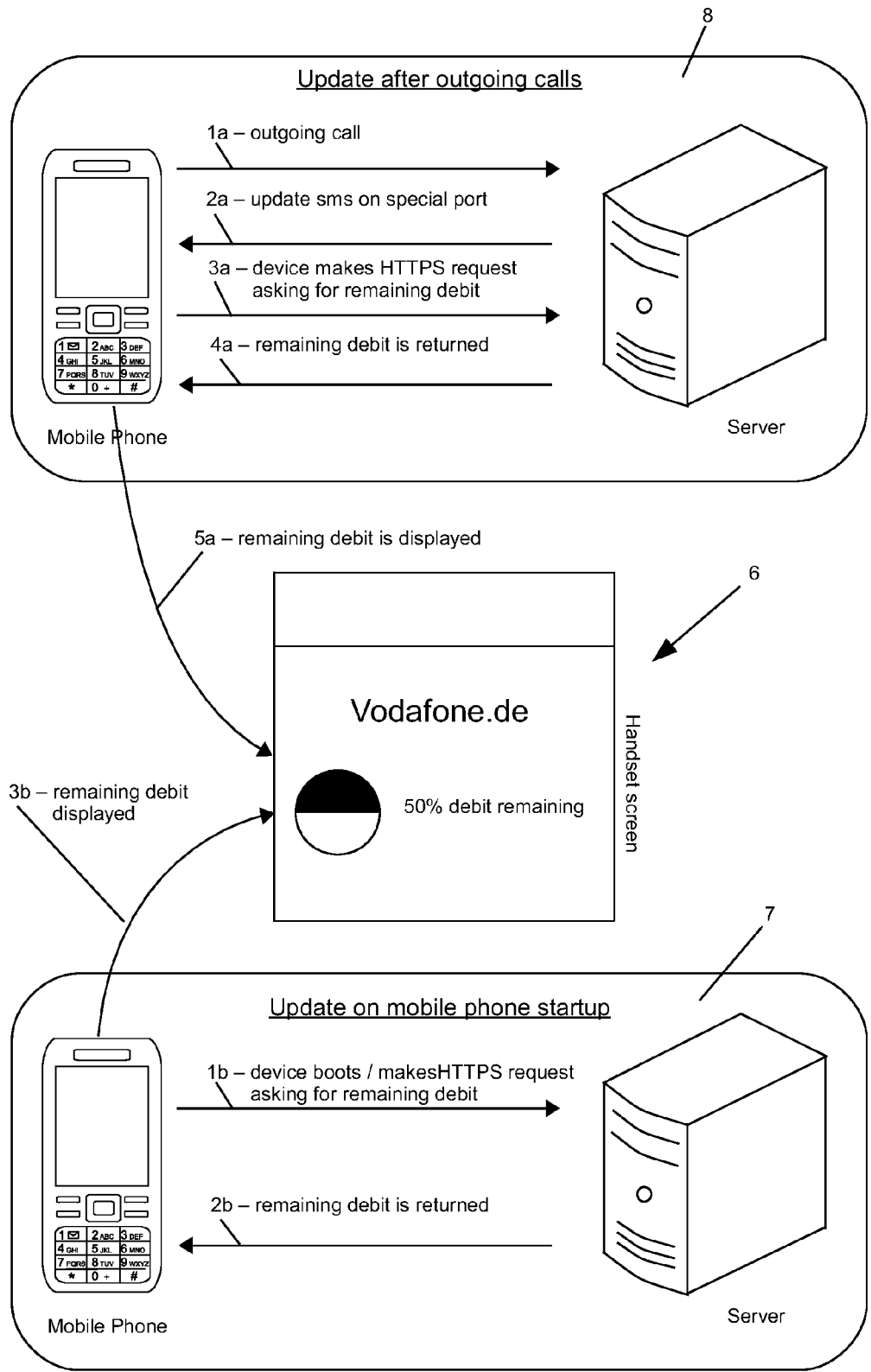

FIG. 2 shows the reproduction of the statement of account of a credit account of a user by means of the display device (display) 6 of a mobile terminal (mobile phone) of the user during an operation according to the invention of the terminal in a mobile network which provides communication services. Herein, the statement of account of the credit account is advantageously reproduced in form of a graphic symbol, in the present case a circle, wherein the actual statement of account will preferably refer as a percentage to a possible charge credit, in the present case preferably in the form of a so called pie chart. In the exemplary embodiment represented in FIG. 2, the actual statement of account of the credit account is 50% of the previously charged credit amount. The reproduction of the actual statement of account in form of a graphic symbol with representation in percentage with respect to the statement of account of a completely charged credit account in the form of a so called pie chart advantageously enables the user to comprehend or estimate the credit which is still available in a simplified manner.

The reproduction of the actual statement of account of the credit account (prepaid) by means of the display device (display) 6 of the user's terminal, which is triggered by a push message triggered by the Debit Left Push Server DLPS, will be automatically initiated after having switched the terminal on and after having logged in the same one in the mobile network (mobile phone startup) (symbolically marked by the reference numeral 7 in FIG. 2), on the one hand, and will be automatically initiated after having completed a chargeable communication service of the mobile network used by the terminal (symbolically marked by the reference numeral 8 in FIG. 2).

Within the scope of switching on 7 the terminal respectively logging in the same one in the mobile network, the terminal addresses an inquiry (referenced by the process step 1b in FIG. 2) with respect to the actual statement of account of the credit account to the Debit Left Push Server DLPS of the mobile network, in the present case by means of HTTPS. Thereupon, the Debit Left Push Server DLPS of the mobile network triggers a push message (push Info) to the terminal of the user in the process step referenced by the numeral 2b in FIG. 2. Herein, the push message (push Info) comprises information with respect to the actual statement of account of the credit account (prepaid) of the user. The information with respect to the actual statement of account of the credit account (prepaid) of the user will then be automatically reproduced by means of the display device (display) 6 of the terminal of the user A-party in the process step referenced by the numeral 3b in FIG. 2.

Within the scope of using 8 a chargeable voice call as example of the use of a chargeable communication service and after having completed the voice call (process step referenced by the reference numeral 1a in FIG. 2), the Debit Left Push Server DLPS of the mobile network triggers the terminal, in the present case by means of an actualization SMS sent via a special port of the mobile network to the terminal (process step referenced by the reference numeral 2a in FIG. 2) to address an inquiry with respect to the actual statement of account of the credit account to the Debit Left Push Server DLPS of the mobile network. In the present case, the inquiry of the terminal to the Debit Left Push Server DLPS of the mobile network is realized in the process step referenced by 3a in FIG. 2 by means of HTTPS. Thereupon, the Debit Left Push Server DLPS of the mobile network triggers a push message (push Info) to the terminal of the user in the process step referenced by the numeral 4a in FIG. 2. Herein, the push message (push Info) comprises information with respect to the actual statement of account of the credit account (prepaid) of the user. The information with respect to the actual statement of account of the credit account (prepaid) of the user will then be automatically reproduced by means of the display device (display) 6 of the terminal of the user A-party in the process step referenced by the numeral 5a in FIG. 2.

The exemplary embodiments of the invention represented in the figures of the drawing and described in connection with these ones only serve for explanation of the invention and are not limiting for this one.

What is claimed is:

1. A method for operating a terminal which can be used with at least one credit account with at least one account statement and/or with at least one subscriber's account with subsequent rendering of accounts with at least one account statement and which can be used in a mobile network which provides communication services, which terminal comprises at least one display device for the optical, acoustic and/or sensual reproduction of information and at least one input device for the optical, acoustic and/or sensual gathering of information, wherein the at least one account statement of the at least one credit account and/or of the at least one subscriber's account with subsequent rendering of accounts will be reproduced by the display device of the terminal at least after having made use of a chargeable communication service, characterized in that after having used a chargeable communication service of the mobile network by means of the terminal,
   a device of the mobile network sends a trigger message which contains information with respect to the costs of the used chargeable communication service of the mobile network
to a server of the mobile network, which realizes a push service,
   the server of the mobile network sends an actualization Short Messaging Service (SMS) to the terminal, which triggers the terminal to address an inquiry with respect to the actual statement account of the credit account to the server of the mobile network, whereupon
   the server then triggers a push message to the terminal using the information of the trigger message,
   which push message contains information with respect to the at least one account statement of the at least one credit account and/or of the at least one subscriber's account with subsequent rendering of accounts, by means of a push service of the mobile network.

2. The method according to claim 1, characterized in that after a chargeable voice call used by the terminal as communication service of the mobile network has been completed, the device of the mobile network sends a trigger message which contains information with respect to the costs and the length of the realized voice call to the server of the mobile network, the server brings the information of the received trigger message into line with a device of a billing system of the mobile network with resect to data regarding the user of the terminal and the server then triggers the push message to the terminal using the information of the trigger message.

3. The method according to claim 1, characterized in that the device of the mobile network is a device of a billing system of the mobile network, which, after a chargeable data connection used by the terminal as communication service of the mobile network has been completed, sends a trigger message which contains information with respect to the costs and/or the data volume of the realized data connection, SMS and/or Multimedia Messaging Service (MMS) to the server of the mobile network and the server then triggers the push message to the terminal using the information of the trigger message.

4. The method according to claim 1, characterized in that a charging of the at least one credit account or a transfer of credit from a credit account or from a subscriber's account with subsequent rendering of accounts to another credit account or another subscriber's account with subsequent rendering of accounts or from a credit account to a subscriber's account with subsequent rendering of accounts is enabled via the mobile network by means of the terminal or via the internet by means of a computer unit, wherein the server is triggered to trigger the push message to the terminal.

5. The method according to claim 1, characterized in that the push message triggers the reproduction of the at least one statement of account of the at least one credit account and/or of the at least one subscriber's account with subsequent rendering of accounts by means of the display device of the terminal.

6. The method according to claim 1, characterized in that the at least one statement of account of the at least one credit account and/or of the at least one subscriber's account with subsequent rendering of accounts will be permanently or temporally reproduced by means of the display device of the terminal.

7. The method according to claim 1, characterized in that the reproduction of a statement of account of a credit account of a user by means of the display device of the mobile terminal of the user will be realized in form of a graphic symbol, wherein the actual statement of account will preferably refer as a percentage to a possible charge credit, most preferably in the form of a so called pie chart.

8. A terminal for the operation in a mobile network which provides communication services, comprising at least one credit account with at least one statement of account and/or at least one subscriber's account with subsequent rendering of accounts with at least one statement of account, which terminal comprises at least one display device for the optical, acoustic and/or sensual reproduction of information and at least one input device for the optical, acoustic and/or sensual gathering of information, characterized in that the terminal is designed and/or adapted to carry out method steps on the part of the terminal according to claim 1.

9. A device in a mobile network which provides communication services, which device is at least partially involved in administrating and/or keeping at least one credit account and/or at least one subscriber's account with subsequent rendering of accounts for billing chargeable communication services which can be utilized by a terminal which can be used in the mobile network, characterized in that said device is designed and/or adapted to carry out method steps on the part of the device according to claim 1.

* * * * *